United States Patent [19]

Wilber et al.

[11] Patent Number: 4,484,174

[45] Date of Patent: Nov. 20, 1984

[54] VIDEO DISC PLAYER HAVING IMPROVED SQUELCH SYSTEM

[75] Inventors: James A. Wilber, Indianapolis, Ind.; Charles M. Wine, Princeton, N.J.

[73] Assignee: RCA Corporation, New York, N.Y.

[21] Appl. No.: 337,841

[22] Filed: Jan. 7, 1982

[51] Int. Cl.[3] .................. H04N 5/93; G11B 9/06; G11B 19/02

[52] U.S. Cl. ..................... 358/340; 358/336; 358/342; 369/32; 369/33; 369/41; 369/126

[58] Field of Search ............... 358/342, 335–336, 358/340; 360/33.1; 369/30, 32, 33, 41, 47–49, 126

[56] References Cited

U.S. PATENT DOCUMENTS

| | | | |
|---|---|---|---|
| 3,864,733 | 2/1975 | Boltz, Jr. ................... | 360/33 |
| 4,017,677 | 4/1977 | Baker ....................... | 358/127 |
| 4,017,678 | 4/1977 | Baker ....................... | 358/128 |
| 4,119,812 | 10/1978 | Fox .......................... | 369/49 |
| 4,286,290 | 8/1981 | Pyles et al. ............... | 358/128.5 |
| 4,307,418 | 12/1981 | Mindel et al. ............. | 358/128.5 |
| 4,387,407 | 6/1983 | Wine ........................ | 358/342 |
| 4,393,489 | 7/1983 | Mehvotra ................. | 358/342 |

FOREIGN PATENT DOCUMENTS 55-70901  5/1980  Japan ........................... 369/32

Primary Examiner—Raymond F. Cardillo, Jr.
Attorney, Agent, or Firm—E. M. Whitacre; P. J. Rasmussen; R. G. Coalter

[57] ABSTRACT

Dual squelch circuits, the first preceding and the second following the video processor of a video disc player, are selectively activated by a control unit which receives transducer position information from the processor for calculation of disc playing time and control of the signal recovery transducer. The first squelch circuit aids in stabilizing the timebase correction servo of the video processor during the player pause operating mode. The second squelch circuit maintains video blanking during certain player transition operating modes (e.g., pause-to-play, load, etc.) while the control unit processes the position information to provide transducer control and playing time indicator signals.

6 Claims, 1 Drawing Figure

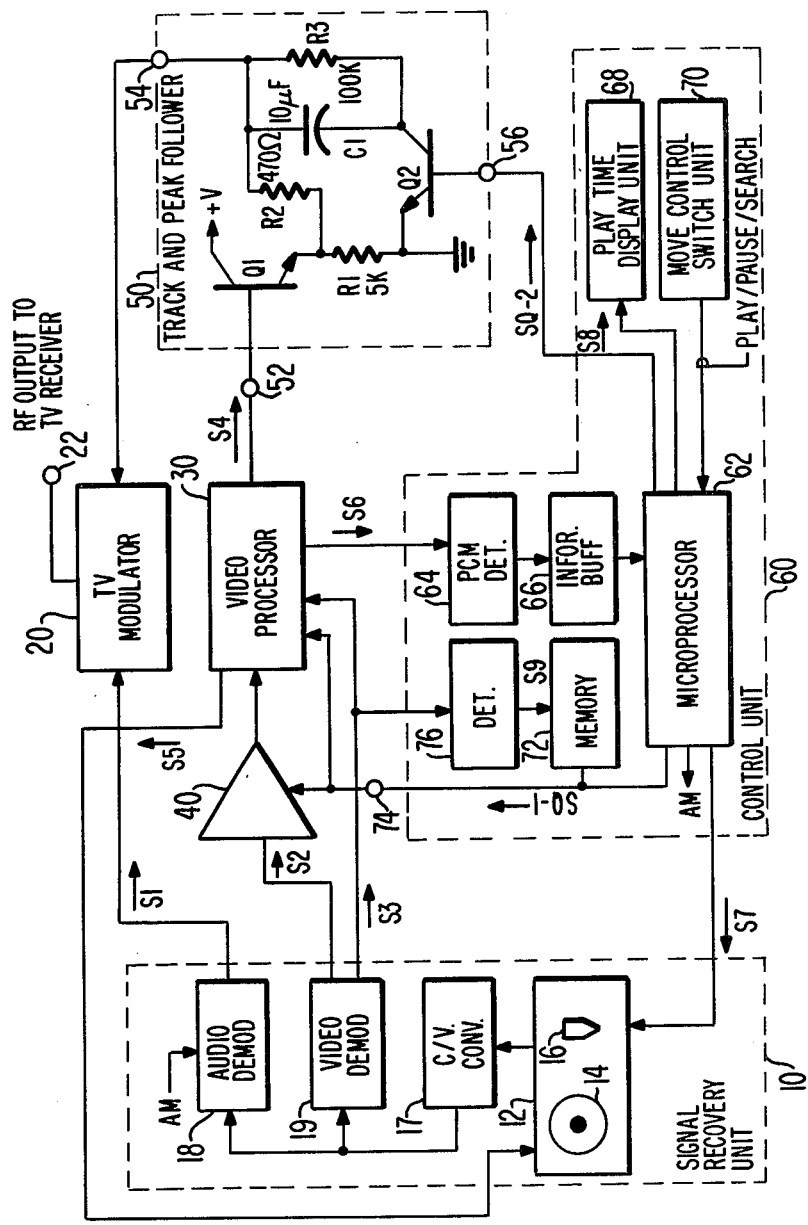

VIDEO DISC PLAYER HAVING IMPROVED SQUELCH SYSTEM

This invention relates to the television arts and particularly to video disc players for use with television receivers.

In conventional video disc players, signals recovered from a video disc record are processed and applied to an RF modulator to provide a player output signal of a form that may be viewed on a standard television receiver or recorded on a video cassette recorder. The processing typically includes such functions as timebase error correction, format conversion, defect correction, etc. As is known, it is advantageous to squelch the video signal at some point within the player during certain player operating modes such as "pause" or "search". In such modes, a viewable picture would not typically be produced as so the video signal is squelched to prevent the appearance of noise or "snow" in the displayed image.

U.S. Pat. No. 4,286,290 entitled "Fast Recovery Squelch Circuit for a Video Disc Player" which issued to Pyles et al., Aug. 25, 1981, discloses a video disc player in which the recovered video signal is squelched prior to processing thereof by the player video signal processor. The processor provides such functions as timebase error correction, comb filtering and color subcarrier frequency translation of the recovered signal. For reasons discussed in detail in the Pyles et al. patent (incorporated herein by reference) squelching of the recovered video signal prior to processing thereof by the video signal processor aids in reducing the player squelch recovery time and in stabilizing the timebase correction servo system in the pause mode of operation.

U.S. patent application Ser. No. 084,393 entitled "Video Disc System" filed Oct. 12, 1979, for C. B. Dieterich and which issued as U.S. Pat. No. 4,308,557 on Dec. 29, 1981 describes a video disc system in which video fields on the disc are identified by digital information recorded during the vertical blanking interval. In the player proposed by Dieterich, the information signal is separated from the recovered video signal by means of a comb filter in the video signal processor and is utilized to control a number of functions during the playing of the disc record such as calculation and display of elapsed playing time, lifting and lowering the pickup stylus, detection and correction of locked grooves, etc.

The present invention resides in part in recognition of a new problem which can arise when a video disc player having a squelch system of the general kind proposed by Pyles et al. is controlled by a device such as a microprocessor which receives transducer position information in some form from the player video signal processor. In such an arrangement, no information is available for use by the microprocessor under squelch conditions. It is recognized herein that under certain conditions it would be desirable to simultaneously obtain transducer position information from the disc and squelch the video signal. One such case is during a time interval when the player operating mode is changing from "pause" to "play". During such a "transition" mode of operation, the microprocessor could process the information to position the stylus at the exact groove it occupied before play was interrupted. Video squelch is desirable under this condition to prevent annoying picture disturbances which might occur during the stylus repositioning process. Another example is when the player is first turned on and the microprocessor is processing the recovered information signal to position the pickup transducer at the starting point of the video disc record. Other examples of operating modes where it is desirable to both squelch the video signal and obtain position information from the player video signal processor are discussed subsequently.

A video disc player embodying the invention includes signal recovery means for recovering a video signal from a video disc record. First and second squelch circuit means are interposed in a video signal path between the signal recovery means and an output terminal. A control means selectively activates the first and second squelch circuit means in accordance with the operating mode of the player.

In the drawing, the sole FIGURE is a block diagram, partially in schematic form, of a video disc player embodying the invention.

The player comprises a signal recovery unit 10 (outlined in phantom) having a turntable 12 for rotating a video disc record 14 and a pickup transducer 16 for recovering information signals from the disc. Illustratively, it will be assumed that the player is intended for use with records in which information is stored in the form of topological variations and this information is recovered by sensing capacitance variations between pickup transducer 16 and the record 14. See, for example, U.S. Pat. No. 3,783,296 entitled "High Density Capacitive Information Records and Playback Apparatus Therefor" which issued to T. O. Stanley, Jan. 1, 1974 and U.S. Pat. No. 3,842,294 entitled "Information Records and Recording/Playback Systems Therefore" which issued to J. K. Clemens, Oct. 15, 1974. It will also be assumed that the video fields recorded on disc 14 are identified by a digital information signal recorded during the vertical blanking interval of the video signal as proposed by C. B. Dieterich in his aforementioned U.S. Pat. No. 4,308,557. Video disc records having such a field identification code are commercially available, for example, from RCA Corporation.

The output of transducer 16 is applied to the input of a capacitance-to-voltage (C/V) converter 17 responsive to capacitance variations between a stylus electrode in transducer 16 and the record being played for producing an FM output signal voltage representative of the recorded video and field data information. A suitable implementation of converter 17 is described in U.S. Pat. No. 4,080,625 entitled "Pickup Circuitry for a Video Disc Player with Printed Circuit Board" which issued to Kawamoto et al., Mar. 21, 1978.

The FM signal produced by converter 17 is demodulated to provide a baseband audio output signal S1 and a baseband video output signal S2 by means of demodulators 18 and 19, respectively. Demodulator 19 has an output for providing a defect indicating signal S3 indicative of departures of the video portion of the FM signal beyond its normal operating range. Illustratively, the demodulators may be implemented as described in U.S. Pat. No. 4,203,134 entitled "FM Signal Demodulator with Defect Detection" which issued to Christopher et al., May 13, 1980. Another example is given in U.S. Pat. No. 4,038,686 entitled "Defect Detection and Compensation" which issued to A. L. Baker, July 26, 1977.

The baseband audio signal S1 produced by demodulator 18 is applied to the sound carrier modulation input terminal of a TV modulator 20 which has an RF output terminal 22 for connection to the antenna input terminal of a television receiver (not shown). The video signal S2 is coupled to the input of a video processor 30 which supplies a processed video signal S4 to the video modulation input terminal of modulator 20. The modulator produces modulated picture and sound carrier waves on a selected TV channel for reception by the receiver. An integrated circuit suitable for use as modulator 20 is the type LM 1889 available, for example, from National Semiconductor, Inc.

Video processor 30 provides various functions such as timebase error ("jitter") correction, color subcarrier frequency translation and defect masking of the signal S2 to produce the processed signal S4. The defect indicating signal S3 is supplied to processor 30 for activating a defect masking circuit therein which substitutes a previous line of stored video signal for the current line when a defect is present. The processor includes a timebase error correction servo that supplies a control signal S5 to transducer 16 that varies the tangential position of the pickup stylus in a sense to minimize timebase errors of the recovered video signal.

A preferred implementation of processor 30 is described in the aforementioned U.S. Pat. No. 4,286,290 of Pyles et al., incorporated herein by reference. The Pyles et al. processor, in addition to providing the aforementioned functions, also includes an input for receiving a squelch signal which, when present, places the timebase correction servo system in the center of its control range for decreasing the servo loop acquistion time upon termination of the squelch signal. In the present invention, this squelch signal is one of two squelch signals generated by a control unit 60 (as will be described subsequently) and is herein designated as squelch signal SQ-1.

An inhibitable amplifier 40 is interposed in the video signal path between demodulator 19 and processor 30 for squelching the recovered video signal S2 when the squelch signal SQ-1 is present. A suitable amplifier is described in U.S. Pat. No. 4,257,009 entitled "Inhibit Circuit for a Differential Amplifier" which issued Mar. 17, 1981 to B. J. Yorkanis. As explained in detail by Pyles et al., it is advantageous to mute or inhibit the video input signal S2 to the processor under squelch conditions to prevent noise which may be generated by the video demodulator from interfering with the centering of the processor timebase correction servo system.

The processed video signal S4 is coupled from processor 30 to modulator 20 via by what will be referred to herein as a "track and peak follower" circuit 50 having an input terminal 52 connected to the output of processor 30 for receiving the processed video signal S4 and an output terminal 54 connected to the video signal modulation input terminal of modulator 20. Circuit 50 (the details of which will be discussed subsequently) has two operating modes controlled by a second squelch signal SQ-2 supplied to its control terminal 56. When signal SQ-2 is absent (e.g., terminal 56 at ground level), circuit 50 assumes a first of its operating modes in which the voltage at terminal 54 follows or "tracks" the instantaneous value of the voltage at terminal 52. When SQ-2 is present (e.g., terminal 56 positive), circuit 50 assumes a second of its operating modes in which the voltage at terminal 54 tracks or "follows" the average of the peak value in the black level sense of the voltage of terminal 52. The peak averaging time constant of the circuit is selected to be substantially greater than one line scan interval of the signal S4 (e.g., hundreds or thousands of microseconds). The purpose of providing an output signal at a constant d.c. level is to ensure that the receiver coupled to terminal 22 will produce a fully blanked raster when signal SQ-2 is present. The reason for smoothing or averaging the peak signal under this condition is to minimize variations ("ripple") in the output voltage of circuit 50. If not compensated for, such a ripple voltage might become amplified in the receiver AGC circuits which, in turn, could result in the appearance of visible patterns in the blanked image displayed by the receiver.

Video processor 30 includes a comb filter which, inter alia, separates the data information signal S6 from the recovered video signal S2. As described in the aforementioned Dieterich U.S. Pat. No. 4,308,557, the signal S6 is a binary coded signal including a start code, an error check code and an information code including video field and record band numbers and is recorded on disc 14 in the form of pulse code modulation (PCM) of the luminance signal level during a selected line (e.g., line 17) of the vertical interval of each field.

The data signal S6 is supplied to a microprocessor 62 in control unit 60 via a PCM detector 64 and an information buffer 66. U.S. Pat. No. 4,275,416 of C. B. Dieterich entitled "PCM Detector" which issued June 23, 1981, describes a suitable implementation of detector 64 and a suitable arrangement for interfacing the PCM detector with the comb filter and timebase correction circuits of video processor 30.

Information buffer 66 includes error checking circuits which determine the validity of each data word detected by PCM detector 64. If a data word is received without error, buffer 66 supplies a data status signal to microprocessor 62 indicating that the data is valid whereupon the valid data is stored in the random access memory (RAM) portion of the microprocessor for processing in accordance with program information stored in the read only memory (ROM) portion of the processor. The microprocessor 62 produces the squelch signals SQ-1 and SQ-2, supplies an audio muting signal AM to audio demodulator 18, a pickup transducer correction and control signal S7 to transducer 16 and a time indicating signal S8 to a disc playing time indicator unit 68, which, illustratively, may be a two digit seven segment light emitting diode (LED) display for indicating disc playing time in minutes.

Microprocessor 62 and information buffer 66, illustratively, may be of the kind described in the aforementioned C. B. Dieterich patent application "Video Disc System". Other U.S. patent applications relating to methods of verifying the validity of the data, data framing, data recording, calculation of disc playing time from the recovered data and transducer tracking error correction signal generation include: "Video Disc Player System for Correlating Stylus Position with Information Previously Detected from Disc", Ser. No. 084,392 by M. J. Mindel and J. C. Rustman which issued Dec. 22, 1981, as U.S. Pat. No. 4,307,418; "Improved Digital on Video Recording and Playback System" Ser. No. 084,465 by T. J. Christopher and C. B. Dieterich which was abandoned in favor of continuation application Ser. No. 322,061 filed Nov. 16, 1981 and which issued Dec. 6, 1983, as U.S. Pat. No. 4,419,649 entitled "Digital on Video Recording and Playback System"; "Improved Error Coding for Video Disc System", Ser. No. 084,396 by T. J. Christopher which issued Jan. 6, 1982 as U.S. Pat. No. 4,309,721 ; and "Track Error Correction System as for Video Disc Player" Ser. No. 084,386 by J. C. Rustman and M. J.

Mindel, all filed Oct. 12, 1979 and which issued Jan. 26, 1982 as U.S. Pat. No. 4,313,134.

Manual selection of various player operating modes is provided by a mode control switch unit 70 coupled to an input port of microprocessor 62. Typical operating modes include, illustratively, play, pause, slow scan forward or reverse and rapid scan forward or reverse. Upon closure of one of a plurality of user activated switches in switch unit 70, microprocessor 62 addresses its internal ROM and fetches an appropriate sequence of instructions resident in the memory for effecting the desired control function.

Control unit 60 further includes a squelch memory 72 coupled to the SQ-1 signal conductor 74 via a two-way bus. When in a SET condition, memory 72 clamps conductor 74 to a low level (e.g., ground) which represents the "active" condition of squelch signal SQ-1. In this condition, amplifier 40 is inhibited and supplies a constant D.C. "black" level signal to processor 30. At the same time, the defect masking circuit in processor 30 is inhibited whereby the constant level signal propagates through processor 30 to the input of circuit 50 and the video timebase correction servo system of processor 30 is placed in the center of its control range.

Memory 72 is placed in a SET condition in response to the simultaneous occurrence of the squelch signal SQ-1 produced by microprocessor 62 and a loss of carrier signal S9 produced by a loss-of-carrier detector 76 and is reset upon termination of the loss-of-carrier signal. The term "loss-of-carrier" refers to the absence of the video FM carrier produced by converter 17. When the stylus in transducer 16 is lifted, as in the "pause" operating mode, the absence of the FM carrier causes a substantial increase in the number of defect indicating pulses (signal S3) produced by the defect detector in demodulator 19. Detector 76 monitors the level of the defect indication pulses and produces the loss-of-carrier indicating signal S9 when the defect pulses exceed a threshold value. Suitable implementations of memory 72 and detector 76 are described in the aforementioned U.S. Pat. No. 4,186,290 of Pyles et al.

In operation, microprocessor 62 supplies the audio muting signal AM to audio demodulator 18 in the pause and fast or slow search operating modes, thereby muting the player audio output signal in all but the normal "play" operating mode. The squelch signal SQ-1 is supplied to inhibitable amplifier 40 and video processor 30 during the pause operating mode when the pickup stylus in transducer 16 is lifted in response to the stylus lift component of the signal S7. The squelch signal SQ-2 is supplied to track and peak follower circuit 50 during the player pause and rapid scan operating modes and also during certain of the player"transition" operating modes. One such transition mode occurs when the player is initially turned on and "loaded" with a record to be played. At that time, microprocessor 62 processes the data signal S6 and supplies stylus "kick" signals to transducer 16 until the starting track of the record is reached. As described in the U.S. Pat. Nos. 4,307,418 and 4,313,134 of Rustman and Mindel, the starting point of record 14 corresponds to record band zero and the endof the record corresponds to band sixty three. (The record band numbers comprise six bits of the data information signal S6.) Another player transition mode of interest to the present invention occurs between the pause and play operating modes and will be referred to herein as the "exit from pause" mode. During this time period, microprocessor 62 supplies stylus kick pulses to transducer 16 until the video field number indicates that the stylus has been positioned in the track convolution groove it was last in when the player was placed in the pause mode. Thus, when the player mode is changed from pause to play, the TV program will resume at exactly the same point where it was interrupted when the player was placed in the pause mode (the microprocessor "remembers" the last field played before "pausing" by storing the field number in its interval RAM).

The reason for supplying the squelch signal SQ-2 to circuit 50 during the player transition mode is to ensure that the TV image is blanked while the stylus is being positioned in the correct groove by the microprocessor. The squelch signal SQ-1 cannot be used for this purpose because the microprocessor requires the data information signal S6 in order to identify the field number of the last field or the band number indicating the correct record starting point during the transition mode time.

As a further illustration of the "double squelching" feature of the invention, assume that record 14 is being played and that the player pause switch is pressed at the time video field number N is present. When that happens, microprocessor 62 stores the number N in its internal RAM and produces the two video squelch signals SQ-1 and SQ-2, the audio muting signal AM and supplies the stylus lift signal to the stylus lifter of transducer 16 which lifts the pickup stylus from the record. The squelch signal SQ-1 inhibits amplifier 40 which then supplies a black level D.C. reference signal to processor 30. Simultaneously, signal SQ-1 activates the clamp circuits in processor 30 which place the timebase correction servo system in the middle of its control range and disables the defect corrector whereby the black level signal propagates through processor 30 to terminal 52 of circuit 50. Circuit 50, in turn, assumes its peak averaging mode of operation and couples the black level signal (D.C.) to modulator 20, thereby blanking the image displayed on the TV receiver. Squelch memory 72 will be SET by the simultaneous presence of the squelch signal SQ-1 and the loss-of-carrier signal S8 and display unit 68 will display the disc playing time (in minutes, for example) calculated in the microprocessor by dividing the stored field N by a constant.

Now assume that the user wishes to resume play of the disc 14. Upon closure of the "play" mode switch in unit 70 (or pressing the "pause" switch a second time) microprocessor 62 supplies a stylus lowering signal to the stylus lifter mechanism of transducer 16 whereupon the FM signal is again recovered from disc 14. At this point, the microprocessor also ceases to supply the squelch signal SQ-1 to squelch bus 74. Memory 72, being in a SET condition, however, continues to supply the squelch signal SQ-1 to amplifier 40 and processor 30 until the defect indicating signal S3 drops below the threshold of loss-of-carrier detector 76. When that happens, memory 72 is RESET thereby terminating the squelch signal SQ-1. The recovered video signal S2 is then supplied to processor 30 which supplies the processed video signal S4 to circuit 50 and the data information signal S6 to microprocessor 62.

During the transition mode from pause to play described above, the squelch signal SQ-2 is maintained active after termination of the squelch signal SQ-1 in order to maintain blanking of the TV image while the microprocessor processes the data information signal S6 to locate the video field where play was previously interrupted. (Blanking is maintained by circuit 50, which detects and averages the black level peaks of signal S4 when squelch signal SQ-2 is present). The previous field number N was stored in RAM during the pause operating mode. To return to that field, the microprocessor compares each current field number with the stored number and supplies "kick" pulses to the stylus kicker of transducer 16 to reposition the pickup stylus until a match of the current and stored field numbers is obtained whereupon the squelch signal SQ-2 and the audio muting signal AM are both terminated. Normal play thus resumes at the same location on the disc where play was interrupted regardless of any error in the initial set down location of the stylus on disc 14.

In the "rapid search" or "scan" mode of operation, the squelch signal SQ-1 is not activated so that processor 30 may separate the data information signal S6 from the recovered video signal S2. Playing time is calculated from signal S6 and displayed on unit 68 to give the user an accurate indication of the location of the position of the pickup stylus on the record. In the "slow" search or scan modes the disc 14 is scanned at a rate of about sixteen times normal playing speed. To provide a visual indication in this mode, the squelch signal SQ-2 is not activated, whereby circuit 50 assumes its first operating mode (tracking). In the "rapid search" mode, the stylus is skipped across the disc at speeds too high to provide a useful displayed image. Accordingly, in this mode, squelch signal SQ-2 is activated thereby placing circuit 50 in its peak averaging mode. In this mode, the average of the black level peaks (sync tips) of the processed video signal S4 is produced by circuit 50 and applied to modulator 20, thereby blanking the displayed image. The black level peaks are averaged for a time period greater than one line scan interval, as previously noted, to prevent any peak-to-peak ripple voltage from producing undesirable ripple patterns on the blanked displayed image.

Turning now to the details of circuit 50, input terminal 52 is connected to the base of of an NPN transistor Q1 having a collector connected to a source of positive supply voltage +V and an emitter coupled to ground via an emitter load resistor. Output terminal 54 is coupled to the emitter of transistor Q1 via a resistor R2 and to the collector of another NPN transistor Q2 via a parallel connection of a capacitor C1 and a resistor R3. The emitter of transistor Q2 is grounded and its base is connected to input terminal 56. Illustrative values for the components are: R1-5000 Ohms; R2-470 Ohms; R3-100,000 Ohms; and C1-10 micro-Farads.

In operation, when the squelch signal SQ-2 at terminal 56 is Low (ground level) transistor Q2 will be off and any charge which might be present on capacitor C1 will be dissipated in resistor R3. Transistor Q1 will then operate as a conventional emitter follower whereby the output voltage at terminal 54 will "track" the instantaneous input voltage at input terminal 52.

Now, assume that the squelch signal SQ-2 is present (terminal 56 high or positive relative to ground). This will turn on transistor Q2 thereby coupling capacitor C1 and resistor R3 to ground. This has the effect of changing the operating mode of transistor Q1 from that of an emitter follower to that of a peak averaging detector. This results because the charging time of capacitor C1 is determined mainly by the value of resistor R2 and is relatively short as compared with the discharge time constant which is determined mainly by the sum of the values of resistors R1 and R2 (Resistor R2 is about 10 times as large as resistor R1). The fast charge—slow discharge of capacitor C1 results in a voltage being stored on capacitor C1 which is nearly equal to the average peak voltage at terminal 52. Averaging or smoothing results because the product R2—C1 of several hundred microseconds is substantially greater than the sync tip pulse period (i.e., about 64 microseconds).

Circuit 50 is designed for video signals in which the synchronizing pulses are of a positive sense. The transistor types may be reversed if this is not the case. Also, field effect transistors may be substituted for the bipolar transistors if desired. Resistor R3 provides a convenient means for discharging capacitor C1 when transistor Q2 is off but may be omitted if desired. Resistor R1 may be replaced by another form of load such as a current source. Transistor Q2 may be referenced to a potential other than ground if desired in a given application.

What is claimed is:

1. A video disc player, comprising: signal recovery means for recovering a video signal and a data signal from a video disc record;
   processor means coupled to said recovery means for receiving said video and data signals and for providing a processed video output signal and a data output signal;
   output means coupled to said processor means for receiving said processed video signal and providing an output signal;
   first squelch circuit means connected between said recovery means and said processor means and responsive to a first squelch signal supplied thereto for squelching said recovered video signal prior to processing thereof by said processing means;
   second squelch circuit means connected between said processor means and said output means and responsive to a second squelch signal supplied thereto for squelching said processed video output signal;
   switch means for providing a player operating mode control signal;
   control means coupled to receive said data output signal and said player operating mode control signal for selectively producing said first and second squelch signals; and wherein
   said second squelch circuit means includes detector means responsive to said second squelch signal for detecting peaks of a given sense of said processed video output signal and for applying the resultant peak detected signal to said output means.

2. A video disc player as recited in claim 1 wherein said control means includes means for concurrently enabling both of said squelch signals in a first operating condition, for concurrently disabling both of said squelch signals in a second operating condition and for disabling the first squelch signal and enabling the second squelch signal during a third operating condition.

3. A video disc player as recited in claim 1 wherein said detector means includes means for averaging said peak detected signal.

4. A video disc player as recited in claim 3 wherein said detector means comprises:
   amplifier means having an input terminal coupled to receive said processed video output signal and an output terminal coupled to said output means;
   a capacitor;
   a source of reference potential; and
   switch means responsive to said second squelch signal for coupling said capacitor between said output terminal of said amplifier means and said source of reference potential.

5. A video disc player as recited in claim 4 wherein said means for averaging said peak detected signal comprises a resistor connected between said amplifier and said capacitor.

6. A video disc player as recited in claim 5 wherein the values of said resistor and said capacitor are selected to provide a time-constant that is greater than one line scan interval of said video signal.

* * * * *